United States Patent [19]

Boudault

[11] 4,393,508

[45] Jul. 12, 1983

[54] SYSTEM FOR LOCALLY TESTING A MODEM EMPLOYING FREQUENCY SHIFT KEYING

[75] Inventor: Robert Boudault, Limours, France

[73] Assignee: U.S. Philips Corporation, New York, N.Y.

[21] Appl. No.: 276,580

[22] Filed: Jun. 23, 1981

[30] Foreign Application Priority Data

Jun. 23, 1980 [FR] France .................. 80 13867

[51] Int. Cl.³ .............................................. H04B 3/46
[52] U.S. Cl. ......................................... 375/9; 371/22; 375/10
[58] Field of Search ............. 179/2 DP; 307/271, 291; 330/294, 303; 332/16, 19; 370/15; 371/22, 24; 375/9, 10, 45, 65

[56] References Cited

U.S. PATENT DOCUMENTS

| | | | |
|---|---|---|---|
| 3,655,915 | 4/1972 | Liberman et al. | 370/15 |
| 3,719,779 | 3/1973 | Wilson | 375/65 |
| 3,793,486 | 2/1974 | Koziol | 179/2 DP |
| 4,323,862 | 4/1982 | Boudault et al. | 375/62 |

Primary Examiner—Benedict V. Safourek
Attorney, Agent, or Firm—Thomas A. Briody; William J. Streeter; Edward W. Goodman

[57] ABSTRACT

A test system is used to test a modem whose modulator is constituted by a multivibrator which during normal operation produces two frequencies $f_1$, $f_2$ in response to the data signal and which is connected to a transmission filter. In response to a test control signal, the multivibrator is modified to supply two test frequencies $f'_1 = nf_1$, $f'_2 = nf_2$, n being substantially equal to the ratio $F_o/f_o$, $F_o$ being the average value of the frequencies received by the modem during normal operation, $f_o$ being the average value of the frequencies $f_1$, $f_2$; at the same time the transmission filter is modified to transmit the two frequencies $f'_1$, $f'_2$ in response to the test control signal.

5 Claims, 5 Drawing Figures

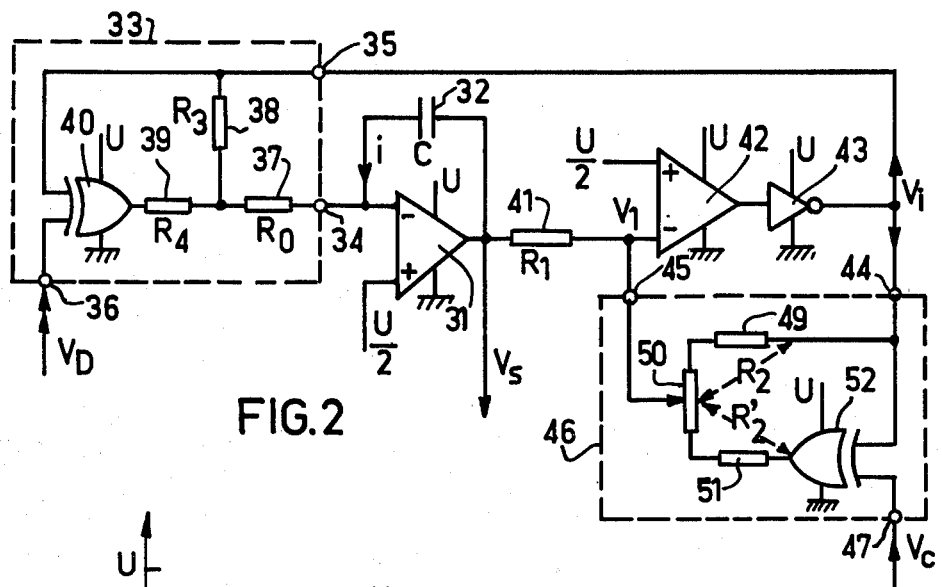
FIG.2
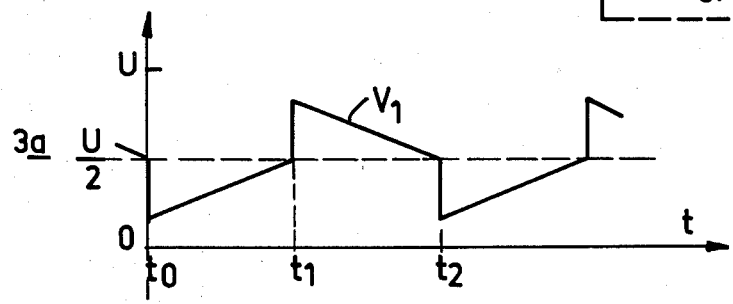
3a
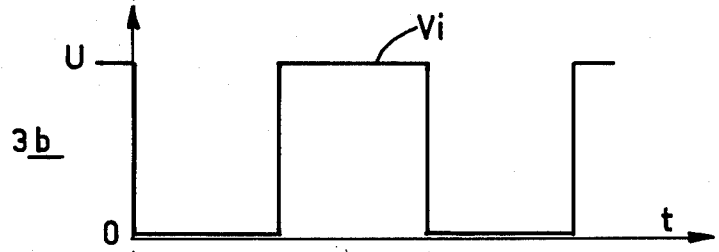
3b
FIG.3
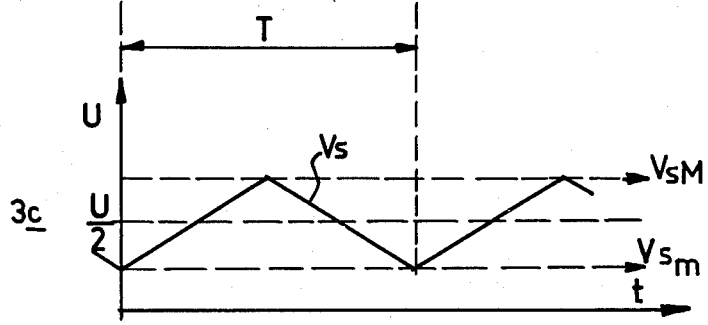
3c

SYSTEM FOR LOCALLY TESTING A MODEM EMPLOYING FREQUENCY SHIFT KEYING

BACKGROUND OF THE INVENTION

The invention relates to a system for locally testing a modem employing frequency shift keying and being coupled to a two-wire transmission line, the two frequencies transmitted by the modem being lower than the two received frequencies and being produced by a modulator in the form of a multivibrator controlled by the data and connected to a transmission filter, the test system comprising means for looping the modem at the transmission line side in response to a test control signal.

A modem of the type considered above is, for example, a modem as defined in the CCITT recommendation V 23, which transmits data at a rate of 75 Baud in the form of two frequencies $f_0 \pm \Delta f$, where $f_0 = 420$ Hz and $\Delta f = 30$ Hz, and receives data at a rate of 1200 Baud in the form of two frequencies $F_0 \pm \Delta F$, where $F_0 = 1700$ Hz and $\Delta F = 400$ Hz. These modems may find a very large range of usage in applications such as electronic telephone directories, video text, etc. and it is important that they are simple and inexpensive to implement. A solution to realize the modulator is the use of a multivibrator circuit whose frequency is controlled by the data, for example as disclosed in U.S. Pat. No. 4,039,952.

Moreover, a local test system must be provided in these modems, this test being performed after a looping of the modem at the transmission line side, which is designated looping 3 in the CCITT recommendation V 54. According to this recommendation, the looping realized for the test must include the maximum number of circuits used during normal operation.

SUMMARY OF THE INVENTION

The present invention has for its object to provide a simple and efficient test system for checking, with a minimum of alterations in the modem, the proper functioning of all the circuits employed during normal operation when the modem is looped at the transmission line side.

According to the invention, the data-controlled multivibrator is arranged so as to produce, in response to the test control signal, two test frequencies which are obtained by multiplying the transmitted frequencies by a factor substantially equal to the ratio between the average values of said received and transmitted frequencies, and the transmission filter is arranged for transmitting said test frequencies in response to the test control signal.

In a preferred embodiment of the multivibrator which constitutes the modulator and is described in detail hereinafter, the multiplication of the frequencies may be performed after a very simple change-over of two resistances, without any alteration in the circuit shifting the frequency as a function of the data. Generally, the transmission filter is a conventional low-pass filter. In a preferred embodiment, described hereinafter, the transmission filter is converted into a band-pass filter for transmitting the two test frequencies and this conversion is performed by means of a simple change of the value of a resistor. Not any further change is necessary in the receiving path to test the modem, as the frequencies applied to the receiving path during a test have an average value which is the same as the average value of the frequencies received during normal operation.

DESCRIPTION OF THE DRAWINGS

The invention will now be further described by way of non-limitative example with reference to the accompanying drawings, in which:

FIG. 2 shows the circuit diagram of an embodiment of a modulator suitable for use in the test system in accordance with the invention;

FIG. 3 shows signal diagrams to explain the operation of the modulator shown in FIG. 2;

DESCRIPTION OF THE PREFERRED EMBODIMENT

Figure 1:
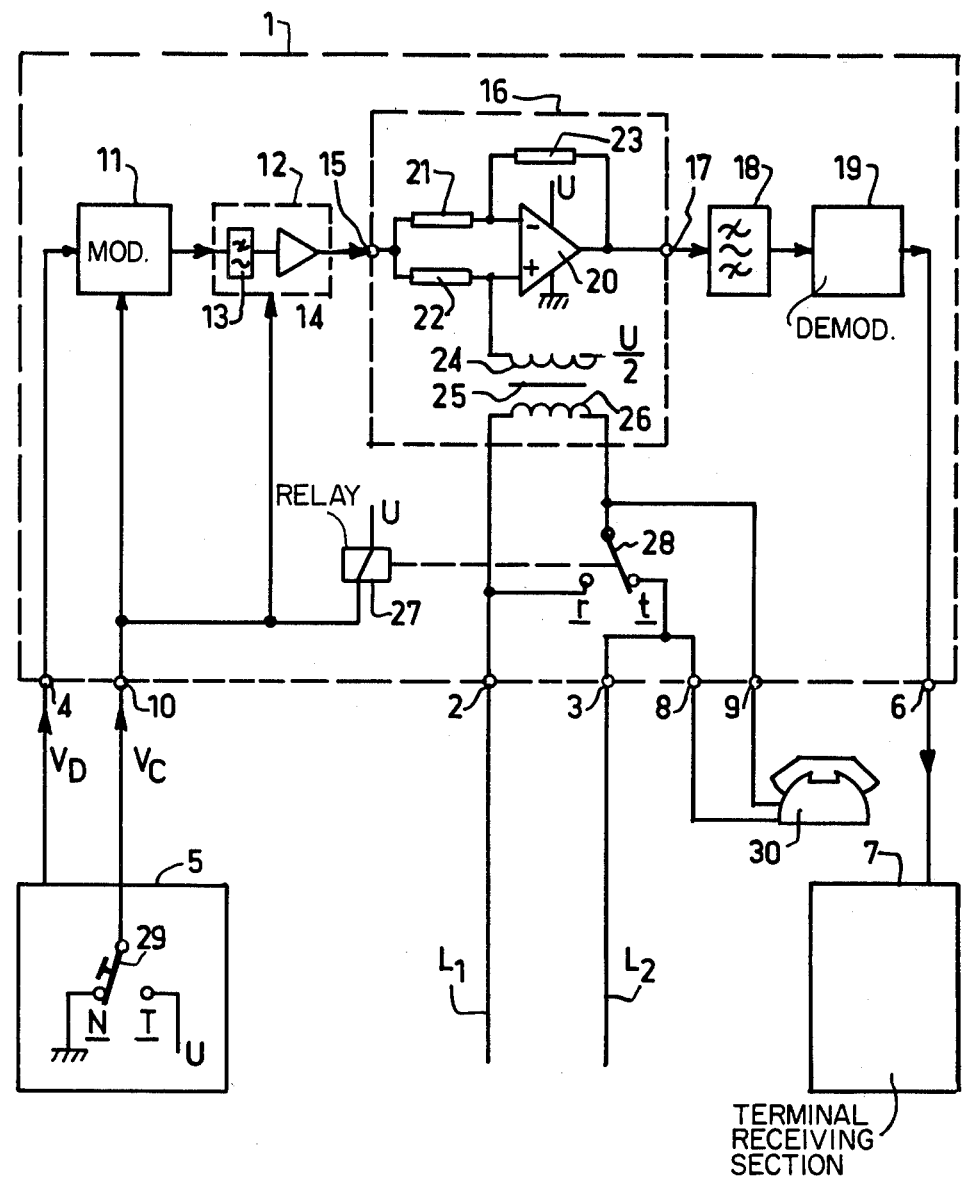
FIG. 1 shows the basic circuit diagram of a modem with which the test system in accordance with the invention is associated.

FIG. 1 shows the basic circuit diagram of a modem connected to a terminal and connections to be made to enable the local test of said modem. By way of example, it is assumed hereinafter that the point at issue is a 75 Baud/1200 Baud data modem defined in the foregoing and connected to a terminal located at the telephone subscriber's end.

A modem 1 is connected by means of its terminals 2 and 3 to two wires $L_1$, $L_2$ of a telephone transmission line. At its terminal 4, it receives data $V_D$ coming from a transmission section 5 of the terminal and from its terminal 6, it applies data to a receiving section 7 of the terminal. In addition, modem 1 is connected by means of its terminals 8 and 9 to a telephone subscriber's set 30 and finally, by means of its terminal 10, it can receive a test control signal $V_c$ coming from the transmission section 5 of the terminal.

Normal operation of the modem will now be described first. This modem employs frequency shift keying and its transmission path comprises a modulator 11 which, in the present example, receives data coming from the terminal 4 at a rate of 75 bits/S and produces a signal which, as a function of the data, is given the frequencies $f_1 = 420 + 30$ Hz and $f_2 = 420 - 30$ Hz. This modulator is an oscillator of the multivibrator type and in a preferred embodiment to be described hereinafter it produces a triangular-shaped signal which is filtered by a transmission filter 12. In normal operation, this filter 12 is a low-pass filter which must transmit the two frequencies $f_1$, $f_2$ and attenuate the higher frequencies to comply with several specified requirements. This filter 12 is an active filter, an embodiment of which will be described hereinafter, and is represented in FIG. 1 in a simplified form by a filter network 13 having resistors and capacitors and by an amplifier 14. The output of filter 12 is connected to a transmission port 15 of a coupling circuit 16 which has for its object to couple modem 1 to transmission line $L_1$, $L_2$.

Connected to a receiving port 17 of said coupling circuit 16 is the receiving path of modem 1 which processes a frequency-shift keyed signal coming from transmission line $L_1$, $L_2$; in the present example, the modulation rate is 1200 Baud and the two received frequencies are, as a function of the data, $F_1 = 1700 + 400$ Hz and $F_2 = 1700 - 400$ Hz. The receiving path comprises, arranged in cascade, a receiving filter 18 which passes the frequencies $F_1$, $F_2$ and has a pass-band centered at the average value $F_0$1700 Hz of the frequencies $F_1$, $F_2$, and a demodulator 19 which supplies the recovered data to terminal 6.

In the embodiment shown, coupling circuit 16 comprises an operational amplifier 20 fed by a voltage U from the positive terminal of a supply source, whose other terminal is connected to ground. The two inputs of this amplifier 20 are connected to transmit port 15 by way of two resistors 21 and 22 and its output is connected to receiving port 17. The inverting input of amplifier 20 is connected to its output by way of a resistor 23 and its non-inverting input is connected to a terminal carrying the voltage (U/2) by way of a winding 24 of a transformer 25. The two terminals of the other winding 26 of transformer 25 are, as will be shown hereinafter, directly connected during normal operation to the two terminals 2 and 3 constituting the two-wire port of the modem. The coupling circuit 16 thus obtained is balanced to the best possible extent, during normal operation, to ensure that virtually no signal coming from transmission chain 11, 12 is present in receiving chain 18, 19, but only the signal coming from transmission line $L_1$, $L_2$ via terminals 2 and 3. This balance is realized by means of the two resistors 21 and 22 of, for example, the same value and the resistor 23 of substantially the value of the impedance seen from the two terminals of winding 24 of transformer 25 and predominantly comprising the impedance of the transmission line.

To test the modem, its looping at the transmission line end must be realized in such a manner that during the test no signal whatsoever will be found on the transmission line and that a data signal coming from transmission chain 11, 12 can be recognized in receiving chain 18, 19. In order to effect the looping of the modem, it is customary to unbalance coupling circuit 16 and this unbalance is realized by short-circuiting winding 26 of transformer 25. In order to realize the looping of the modem at the instant a test is performed, a relay formed by a coil 27 and an inverting contact 28 are included in FIG. 1. Coil 27 has a terminal carrying the voltage U and the other terminal receives a test control signal $V_c$ which has a value O during normal operation and a value U during a test. This signal $V_c$ is produced, for example, as shown in FIG. 1, by means of the manual change-over circuit 29 which is in the position N during normal operation and in the position T during a test. FIG. 1 shows that during normal operation relay 27 is energized, inverting contact 28 is in position t and the two terminals of winding 26 of transformer 25 are connected to the two wires $L_1$, $L_2$ of the transmission line. During the test of the modem, relay 27 is de-energized, inverting contact 28 is in position r and winding 26 is short-circuited. In addition, it is shown that telephone subscriber's set 30 connected to terminals 8, 9 is short-circuited during normal operation of the modem and connected to the transmission line during the remaining period of time.

The looping of the modem being realized as described above, the present invention provides means to adapt during the test, with a minimum of modifications, the transmission chain, which normally operates at 420±30 Hz, to the receiving chain, which normally operations at 1700±400 Hz, in order to enable checking the proper operation of all the circuits of the modem.

According to the invention, the multivibrator constituting modulator 11 is controlled by test control signal $V_c$ in order to produce during a test, as a function of the data, two frequencies $f'_1$ and $f'_2$ resulting from a multiplication of the frequencies $f_1$ and $f_2$ transmitted during normal operation by a factor n substantially equal to the ratio $F_0/f_0$, $F_0$ being the average value of the two received frequencies $F_1$, $F_2$ during normal operation and $f_0$ being the average frequency of the two transmitted frequencies $f_1$ and $f_2$ during normal operation. At the same time, transmission filter 12 is controlled by the control signal $V_c$ in order to transmit, during a test, the frequencies $f'_1 = nf_1$ and $f'_2 = nf_2$.

In the present example, the frequencies $f'_1$ and $f'_2$ to be produced by modulator 11 during a test are 1700/420(420±30) Hz≈1700±121 Hz. During normal operation, filter 12 is, as described in the foregoing, a low-pass filter for transmitting the two frequencies $f_1$, $f_2$ equal to 420±30 Hz and attenuating the higher frequencies. During a test, this filter is converted in such a manner that it is turned into a bandpass filter passing the two frequencies $f'_1$, $f'_2$. Hereinafter a description will be given of the preferred embodiments of the multivibrator constituting modulator 11 and of transmission filter 12, by means of which the characteristics required for the test can be modified in a very simple way by having virtually all the circuits employed during normal operation operate. Not any further change is required for the test in the other circuits of the modem, that is to say coupling circuit 16 and receiving chain 18, 19. The two frequencies $f'_1$, $f'_2$ equal to 1700±121 Hz and applied to the receiving chain during a test are actually accurately centered around the average frequency $F_0 = 1700$ Hz of the two frequencies 1700±400 Hz received during normal operation. On the other hand, in this example, the frequency shift of the signal applied to the receiving chain is weaker during a test ($2\Delta f' = f'_1 - f'_2 = 242$ Hz) than during normal operation ($2\Delta F = F_1 - F_2 = 800$ Hz), which ensures that the two frequencies $f'_1$, $f'_2$ are passed by receiving filter 18 without any noticeable loss in level.

FIG. 2 shows a preferred embodiment of modulator 11 implemented in the form of an easily switchable multivibrator for producing, as a function of the data, either the frequencies $f_1$, $f_2$ employed during normal operation or the frequencies $f'_1 = nf_1$ and $f'_2 = nf_2$.

The modulator of FIG. 2 comprises an integrating circuit formed by an operational amplifier 31, a capacitor 32 of a capacitance C connected between the inverting input and the output of amplifier 31, and finally a network 33, a terminal 34 of which is connected to the inverting input of operational amplifier 31. At an other terminal 35, this network 33 receives a two-level voltage $V_i$ and at its control terminal 36 it receives data signal $V_D$. As will be explained hereinafter, a current which particularly depends on the value of data signal $V_D$ flows between terminals 34 and 35 of network 33. To this end network 33 is formed by two series resistors 37 and 38 of resistance value $R_0$ and $R_3$, respectively, connected between terminals 34 and 35 and by a resistor 39 of resistance value $R_4$ connected between the junction of resistors 37 and 38 and the output of an "exclusive-OR" circuit 40. One input of this "exclusive-OR" circuit is connected to terminal 35 of network 33 and the other input is connected to control terminal 36 of this network. Amplifier 31 and "exclusive-OR" circuit 40 are fed by the voltage source U. The non-inverting input of amplifier 31 is connected to a voltage U/2. The output signal of amplifier 31 constitutes the output signal $V_S$ of the modulator.

By means of a resistor 41 of resistance value $R_1$, the output of operational amplifier 31 is connected to the inverting input of an operational amplifier 42 forming a comparator. This comparator 42 is also supplied by the voltage source U and its non-inverting input is connected to the voltage U/2. The output of comparator 42 is connected to an inverter 43 which is also supplied by the voltage U. The output of inverter 43 is connected to terminal 35 of network 33 and also to a terminal 44 of a network 46 whose other terminal 45 is connected to the inverting input of comparator 42. As described hereinafter, between terminals 44 and 45 of network 46 there flows a current which particularly depends on the value of test control signal $V_c$ applied to its control terminal 47 and coming from change-over circuit 29 of FIG. 1.

To this end, network 46 is formed by a resistor 49 connected between terminal 44 and one end of a potentiometer 50, and by a resistor 51 connected between the other end of this potentiometer 50 and the output of an "exclusive-OR" circuit 52. The movable contact of potentiometer 50 is connected, via terminal 45, to the inverting input of comparator 42. The value of the resistance arranged between the movable contact and terminal 44 will be denoted $R_2$ hereinafter and the value of the resistance arranged between the movable contact and the output of "exclusive-OR" circuit 52 is denoted $R'_2$. Finally, the two inputs of this "exclusive-OR" circuit are respectively connected to terminals 44 and 47 of the network 46.

At the output of inverter 43, a two-level voltage $V_i$ is obtained which changes from the value 0 to the value U when the voltage $V_1$ at the inverting input of comparator 42 becomes somewhat higher than the voltage U/2 and which changes from the value U to the value 0 when the voltage $V_1$ becomes somewhat lower than the voltage U/2. This triggering action is produced with a certain hysteresis owing to the fact that when the output voltage $V_i$ of inverter 43 changes from 0 to U, the voltage $V_1$ increases suddenly from the value U/2 to a value much higher than U/2 and when the output voltage $V_i$ changes from U to 0 the voltage $V_1$ decreases suddenly from the value U/2 to a value much lower than U/2. This mode of operation is similar to that of the circuit known as Schmitt-trigger.

The operation of the modulator of FIG. 2 will now be described. This operation is illustrated by the diagrams shown in FIG. 3. Diagram 3a shows the signal $V_1$ at the inverting input of comparator 42; diagram 3b shows the two-level signal $V_i$ at the output of inverter 43 and diagram 3c shows the output signal $V_S$ of the oscillator.

The starting point of this explanation is the instant just prior to the instant $t_0$ at which the descending signal $V_1$ reaches the voltage U/2 applied to the non-inverting input of comparator 42. The signal $V_i$ then has the value U. The current $I_m$ flowing through network 46 from terminal 44 to terminal 45 may assume two values, depending on whether test control signal $V_c$ has the value 0 or U. It can be shown in a simple way that the two values of this current $I_m$ are:

$$I_{m1} = \frac{U}{2}\left(\frac{1}{R_2} + \frac{1}{R'_2}\right) \text{ for } V_c = O \quad (1)$$

$$I_{m2} = \frac{U}{2}\left(\frac{1}{R_2} - \frac{1}{R'_2}\right) \text{ for } V_c = U \quad (2)$$

As the current $I_m$ also flows through resistor 41 of resistance value $R_1$, it can be derived that the signal $V_{Sm}$ outputted by the modulator just before the instant $t_0$ may assume two values as a function of test control signal $V_c$:

$$V_{Sm1} = \frac{U}{2}\left[1 - R_1\left(\frac{1}{R_2} + \frac{1}{R'_2}\right)\right] \text{ for } V_c = O \quad (3)$$

$$V_{Sm2} = \frac{U}{2}\left[1 - R_1\left(\frac{1}{R_2} - \frac{1}{R'_2}\right)\right] \text{ for } V_c = U \quad (4)$$

At the instant $t_0$, comparator 42 changes state, signal $V_i$ drops to zero and signal $V_1$ decreases suddenly to a value which is lower than U/2. A current i then flows through network 33 from terminal 34 to terminal 35, which current must be applied to capacitor 32. This current i may then assume two values, depending on whether data signal $V_D$ has the value 0 or U. As in practice the signal at the inverting input of operational amplifier 31 remains equal to U/2, it can be easily shown that the two values of the current i are:

$$i_1 = \frac{U}{2} \cdot \frac{\frac{1}{R_3} + \frac{1}{R_4}}{1 + R_o\left(\frac{1}{R_3} + \frac{1}{R_4}\right)} \text{ for } V_D = O \quad (5)$$

$$i_2 = \frac{U}{2} \cdot \frac{\frac{1}{R_3} - \frac{1}{R_4}}{1 + R_o\left(\frac{1}{R_3} + \frac{1}{R_4}\right)} \text{ for } V_D = U \quad (6)$$

The current i applied to capacitor 32 of capacitance value C remains substantially constant after the instant $t_0$ and output signal $V_S$ of the modulator increases linearly with the slope i/C, where i may assume either the value $i_1$ or the value $i_2$ depending on the value of data signal $V_D$.

Signal $V_1$ also increases linearly and it can be shown that just prior to the instant $t_1$ at which it reaches the voltage U/2 applied to the non-inverting input of comparator 42, the current flowing through network 46 may assume, as a function of test control signal $V_c$, the values $I_{m1}$ and $I_{m2}$ indicated in the formulae (1) and (2), in the opposite direction compared with the current $I_m$ flowing just prior to the instant $t_0$. It can be derived that signal $V_{SM}$ outputted by the modulator just before the instant $t_1$ may assume two values as a function of test control signal $V_c$:

$$V_{SM1} = \frac{U}{2}\left[1 + R_1\left(\frac{1}{R_2} + \frac{1}{R'_2}\right)\right] \text{ for } V_c = O \quad (7)$$

$$V_{SM2} = \frac{U}{2}\left[1 + R_1\left(\frac{1}{R_2} - \frac{1}{R'_2}\right)\right] \text{ for } V_c = U \quad (8)$$

At the instant $t_1$ comparator 42 changes state, inverter 43 produces a signal $V_i = U$ and signal $V_1$ increases suddenly to a value higher than U/2. Current i flowing through network 33 then reverses its direction, while maintaining one of the two values $i_1$ or $i_2$, depending on the value of data signal $V_D$. Output signal $V_S$ decreases linearly with a slope which has the same absolute value as the slope after the instant $t_0$. At the instant $t_2$, the circuit operates in the same manner as explained for the instant $t_0$.

It can be easily seen from diagram 3c that the slope $i/C$ with which output signal $V_S$ increases or decreases may alternatively be written $$\frac{V_{SM} - V_{Sm}}{T/2}$$

T being the period of signal $V_S$. It can be derived therefrom that in a general way the frequency f of output signal $V_S$ of the modulator may be written as:

$$f = \frac{i}{C} \cdot \frac{1}{V_{SM} - V_{Sm}} \quad (9)$$

By transferring to this formula (9) one of the two possible values of i given by the formulae (5) and (6), one of the possible values of $V_{SM}$ given by the formulae (3) and (4) and finally, one of the possible values of $V_{SM}$ given by the formulae (7) and (8), the different possible values for the frequency f are obtained as a function of data signal $V_D$ and test control signal $V_c$. In normal operation, that is to say for $V_c=0$, it is obtained that:

for $V_D = 0, f_1 =$ (10)

$$\frac{R_2 R'_2}{R'_2 + R_2} \cdot \frac{1}{4CR_1} \left[ \frac{\frac{1}{R_3} + \frac{1}{R_4}}{1 + R_o \left( \frac{1}{R_3} + \frac{1}{R_4} \right)} \right]$$

for $V_D = U, f_2 =$ (11)

$$\frac{R_2 R'_2}{R'_2 + R_2} \cdot \frac{1}{4CR_1} \left[ \frac{\frac{1}{R_3} - \frac{1}{R_4}}{1 + R_o \left( \frac{1}{R_3} + \frac{1}{R_4} \right)} \right]$$

In the testing mode, that is to say for $V_c=U$, it is obtained that:

for $V_D = 0, f'_1 =$ (12)

$$\frac{R_2 \cdot R'_2}{R'_2 - R_2} \cdot \frac{1}{4CR_1} \left[ \frac{\frac{1}{R_3} + \frac{1}{R_4}}{1 + R_o \left( \frac{1}{R_3} + \frac{1}{R_4} \right)} \right]$$

for $V_D = U, f'_2 =$ (13)

$$\frac{R_2 \cdot R'_2}{R'_2 - R_2} \cdot \frac{1}{4CR_1} \left[ \frac{\frac{1}{R_3} - \frac{1}{R_4}}{1 + R_o \left( \frac{1}{R_3} + \frac{1}{R_4} \right)} \right]$$

These formulae show that the multiplication factor n appearing in $f'_1=nf_1$ and $f'_2=nf_2$, has the value:

$$n = \frac{R'_2 + R_2}{R'_2 - R_2}$$

In practice, the various resistors of the modulator can be adjusted so as to ensure that during normal operation they produce the required frequencies $f_1$ and $f_2$ and during a test, the frequencies $f_1$ and $f_2$ multiplied by the required ratio n. It is advantageous to provide network 46 with a potentiometer 50 connected as shown in FIG. 2. Thus, the final adjustment of multiplying factor n can be performed by means of the movable contact of this potentiometer without virtually changing the frequencies $f_1$ and $f_2$ as the sum $R'_2+R_2$ remains fixed.

From the circuit diagram of FIG. 2 it is obvious that all the components of the modulator which are used in normal operation are also operative during a test. In addition, it will be seen that the frequency modulation by data signal $V_D$ is performed in exactly the same manner in the two operating modes, which contributes still further to the efficiency of the test.

A further advantage of the modulator shown in FIG. 2 is that it only requires one sole supply source, as the reference voltages U/2 applied to the inputs of the operational amplifiers can be obtained by means of a voltage divider connected to this voltage source. Finally, it is advantageous that the active circuits are implemented in CMOS technology, which reduces the output resistance of these circuits and consequently their absolute variation versus temperature.

Figure 4:
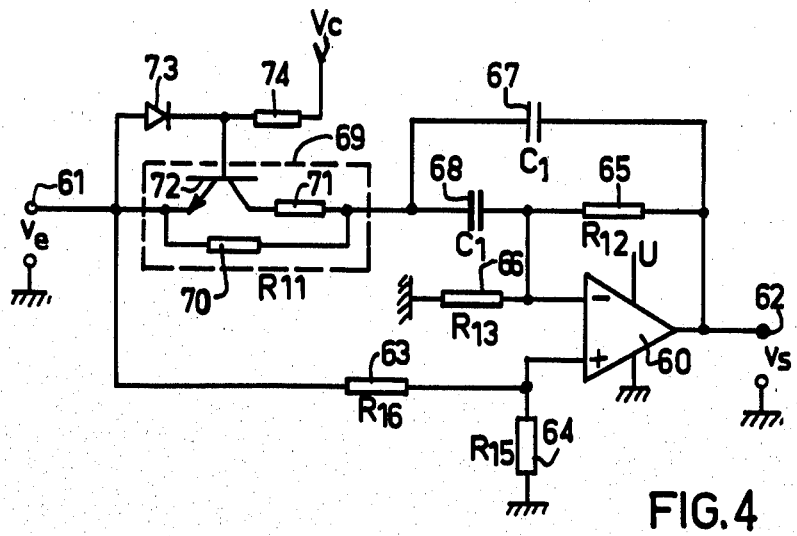
FIG. 4 shows the circuit diagram of an embodiment of a transmission filter suitable for use in the test system in accordance with the invention.

FIG. 4 shows the circuit diagram of an embodiment of a transmission filter 12 which can easily be switched from a low-pass filtering function for transmitting the frequencies $f_1$, $f_2$ during normal operation to a band-pass filtering function for transmitting the frequencies $f'_1=nf_1$ and $f'_2=nf_2$ during a test. The particular advantage of this embodiment is that all the circuits are operative during the two operating modes.

The filter shown in FIG. 4 is an active filter comprising an operational amplifier 60 fed by the voltage source U. The filter has an input terminal 61 receiving an input voltage $V_e$ and an output terminal 62 connected to the output of amplifier 60 and producing the output voltage $V_s$. Input terminal 61 is connected to one end of a voltage divider formed by the series arrangement of resistors 63, 64 of the respective resistance values $R_{16}$ and $R_{15}$. The other end of the voltage divider is connected to ground and its common junction is connected to a non-inverting input of amplifier 60. The inverting input of this amplifier 60 is connected to the junction of two resistors 65 and 66 of resistance value $R_{12}$ and $R_{13}$, respectively. The other end of resistor 65 is connected to the output of amplifier 60 and the other end of resistor 66 is connected to ground. The series arrangement of two capacitors 67 and 68 of the same value $C_1$ is connected to the terminals of resistors 65. The junction of these two capacitors is connected to terminal 61 of the filter via a circuit 69, which behaves as a resistor of a resistance value $R_{11}$ varying with test control signal $V_c$. This circuit 69 is formed by a resistor 70 to whose terminals the series arrangement of a resistor 71 and the emitter-collector path of a npn-transistor 72 are connected. In the sense indicated in the drawing, a diode 73 is connected between the base and the emitter of this transistor 72. The base of transistor 72 receives test control signal $V_c$ via a resistor 74. During normal operation, transistor 72 is non-conducting and the resistance value $R_{11}$ of circuit 69 is equal to that of resistor 70. During a test transistor 72 is conductive and the resistance value $R_{11}$ of circuit 69 is the same as that of the parallel arrangement of resistors 70 and 71.

It can be shown that the transfer function $H(p)=V_s/V_e$ of the filter described in the foregoing, may be written in a general form as:

$$H(p) = \frac{A\left(\frac{\omega_r^2}{K} + p^2\right)}{\omega_r^2 + p\frac{\omega_r}{Q} + p^2} + \frac{A'p\frac{\omega_r}{Q}}{\omega_r^2 + p\frac{\omega_r}{Q} + p^2} \quad (14)$$

where $p = j\omega$  $\omega = 2\pi f$
and:

$$(15)\begin{cases} \omega_r = \dfrac{1}{C_1\sqrt{R_{11}\cdot R_{12}}} \\ Q = \sqrt{\dfrac{R_{12}}{R_{11}}} \\ K = \dfrac{1}{1 + \dfrac{R_{12}}{R_{13}}} \\ A = \dfrac{R_{15}}{R_{15} + R_{16}} \\ A' = A\left(1 + \dfrac{R_{12}}{R_{13}} + \dfrac{R_{12}}{2R_{11}}\right) - \dfrac{R_{12}}{2R_{11}} \end{cases}$$

For a person skilled in the art it will be obvious that for $K<1$ the first term of formula (14) is the transfer function of a second-order low-pass filter having a maximum transmission for the resonant frequency $f_r = \omega_r/2\pi$ and zero transmission for the frequency $f_z = f_r/\sqrt{K}$. The curve LP in FIG. 5 illustrates, as a function of the frequency f, the gain $|H(p)|$ of the low-pass filter corresponding to the first term of formula (14); this gain is expressed in dB and the literal values shown may easily be obtained on the basis of formula (14).

The second term of formula (14) is the transfer function of a band-pass filter whose passband is approximately centered around the frequency $f_r = \omega_r/2\pi$.

In order to define the two configurations the filter must have for the normal operating mode and for the testing mode, the example already cited above will hereinafter be used in which the two frequencies $f_1$, $f_2$ to be transmitted during normal operation have the values $420\pm30$ Hz and the two frequencies $f'_1$, $f'_2$ to be transmitted during the test have the values $1700\pm121$ Hz.

Figure 5:
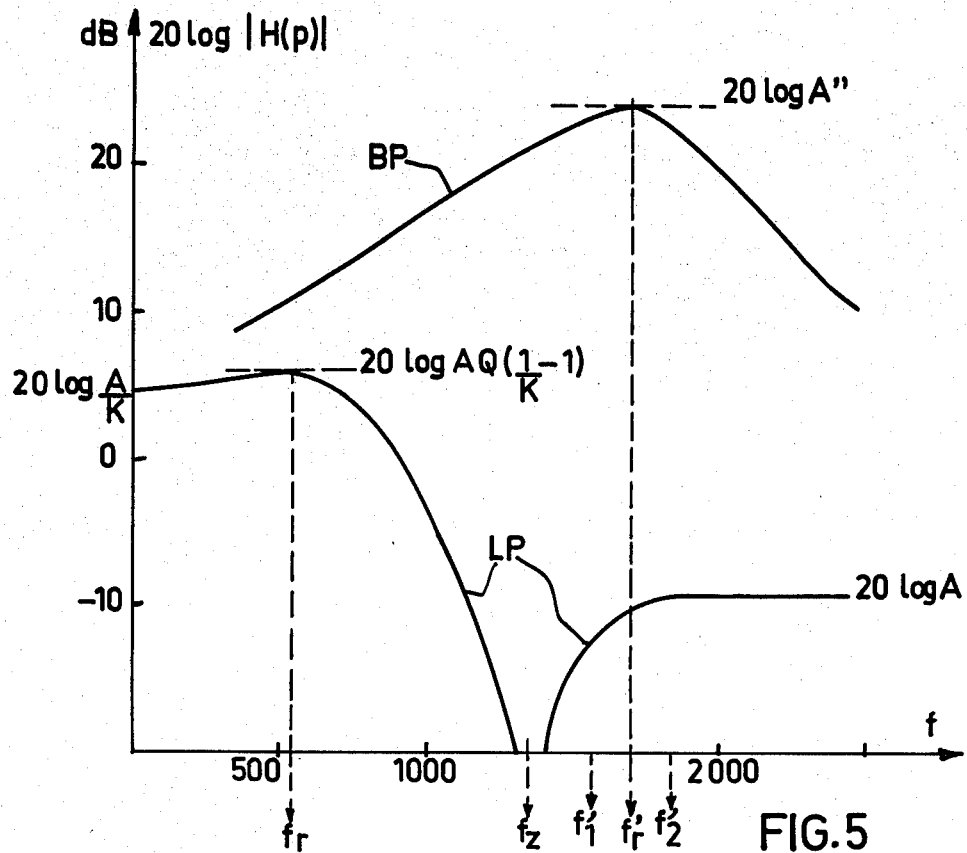
FIG. 5 shows the gain of the transmission filter of FIG. 4 during normal operation and during testing.

For the normal operating mode, the elements of the filter are chosen in such a manner that its transfer function is the same as that of a low-pass filter the gain of which has the shape shown by curve LP of FIG. 5, that is to say it contains only the first term of formula (14) and not the second term. Choosing the elements of the filter may be done on the basis of the 5 equations (15). More particularly, $A'$ is fixed at $A'=0$ to eliminate the second term of formula (14). Then the frequency $f_r = \omega_r/2\pi$ is fixed which may be somewhat higher than the frequencies $f'_1$, $f_2$ to be transmitted. For example, $f_r = 532$ Hz to transmit $f_1$, $f_2 = 420\pm30$ Hz. The frequency $f_z$ is fixed at the point where the filter has zero value, which means fixing K. In the example chosen here, $f_z = 1250$ Hz, which is very close to one of the frequencies $F_1$, $F_2 = 1700\pm400$ Hz received by the modem during normal operation. By finally choosing the values for A and Q, the shape of the gain curve of the low-pass filter is completely defined. Thus, by fixing the value for a capacitor $C_1$, the values of the resistors $R_{11}$, $R_{12}$, $R_{13}$, $R_{15}$, $R_6$ can be determined from the 5 equations (15).

The ohmic value of circuit 69, which was determined as described in the foregoing to ensure that the filter functions as a low-pass filter, is designated $R_{11}^N$. In order to ensure that during a test the filter operates in the pass-band for the transmission of the two frequencies $f'_1$, $f'_2$ centered around the resonant frequency $f'_r$ of the band-pass filter, it is sufficient to give circuit 69 a different resistance value $R_{11}^T$, such as:

$$R_{11}^T = \frac{R_{11}^N}{m^2} \text{ where } m = \frac{f'_r}{f_r} \quad (16)$$

Actually, by giving circuit 69 an ohmic value which differs from $R_{11}^N$, the second term of the formula (14) which represents the transfer function of a band-pass filter is no longer equal to zero. By giving the circuit 69 the resistance value $R_{11}^N/m^2$ and by maintaining the same value for the other elements of the filter, it will be seen that in accordance with the equations (15):

$\omega_r$ becomes $\omega'_r = 2\pi f'_r = m\omega_r$
Q becomes $Q' = mQ$
$A'$ becomes $$A'' = A\left(1 + \frac{R_{12}}{R_{13}} + \frac{R_{12}}{2R_{11}^N}m^2\right) - \frac{R_{12}m^2}{2R_{11}^N}$$

A and K are interchanged. The transfer function of the filter becomes:

$$H'(p) = \frac{A\left(\frac{\omega'_r{}^2}{K} + p^2\right)}{\omega'_r{}^2 + p\frac{\omega'_r}{Q'} + p^2} + \frac{A''p\frac{\omega'_r}{Q'}}{\omega'_r{}^2 + p\frac{\omega'_r}{Q'} + p^2} \quad (17)$$

In a certain frequency range around $f'_r = \omega'_r/2\pi$, the second term of formula (17) is the main element. This second term corresponds to the transfer function of a band-pass filter centered approximately at the resonant frequency $f'_r$. The gain of this filter is substantially equal to $A''$ for the resonant frequency $f'_r$. It tends towards A when the frequency f tends towards infinity and toward A/K when the frequency f tends towards 0. The gain of the filter corresponding to formula (17) has, as a function of the frequency, the shape represented by curve BP in FIG. 5, this gain being expressed in dB. The gain is at its maximum for the frequency $f'_r$. The two frequencies $f'_1$ and $f'_2$ are situated on either side of the frequency $f'_r$ and are transmitted with a reduced attenuation. The numerical values plotted on the axis of FIG. 5 correspond to a transmission filter which is realized for the modem which was used in the foregoing by way of example.

The change from the gain curve LP of a low-pass filter for normal operation to the gain curve BP of a band-pass filter for operation in the testing mode, is performed by simply changing the ohmic value of circuit 69 from $R_{11}^N$ to $R_{11}^N/m^2$, in accordance with formula (16). In the example chosen, $m = 1700/532 \approx 3.19$. Changing the ohmic value of circuit 69 is done by means of test control signal $V_c$ as explained in the foregoing.

What is claimed is:

1. A system for locally testing a modem employing frequency shift keying and being coupled to a two-wire transmission line, the two frequencies transmitted by the modem being lower than the two received frequencies and being produced by a modulator, in the form of multivibrator controlled by the data and connected to a transmission filter, the test system comprising means for looping the modem at the transmission line side in response to a test control signal, characterized in that said modulator comprises means for causing said modulator to produce, in response to said test control signal, two test frequencies, said two test frequencies being the respective products of said two frequencies transmitted by said modem multiplied by a multiplying factor, said multiplying factor being substantially equal to the ratio between the average values of said two received frequencies and said two frequencies transmitted by said modem, and said transmission filter comprises means for changing, in response to said test control signal, the transfer characteristics of said transmission filter in order that said two test frequencies may be transmitted therethrough.

2. A test system as claimed in claim 1, characterized in that said modulator comprises an integrating circuit having an input and an output, a bistable circuit with trigger hysteresis having an input coupled to the output of said integrating circuit and an output, and a first resistance network coupling the output of said bistable circuit to the input of said integrating circuit, said first resistance network having logic means for controlling, as a function of the data signal, the current applied by said first resistance network to said integrating circuit causing said integrating circuit to produce a triangular signal whose frequency depends on the data signal, and characterized in that said means for causing said modulator to produce said two test frequencies comprises a second resistance network coupled between the output and the input of said bistable circuit, said second resistance network having logic means for controlling the current flowing through said second resistance network as a function of said test control signal, said first and second resistance networks having resistors therein, the resistance values thereof being chosen such that the frequencies produced by said modulator as a function of the data signal have the required values $f_1$, $f_2$ of the two frequencies transmitted by said modem during normal operation and the values $nf_1$ and $nf_2$ of the two test frequencies during the testing mode, n being said multiplying factor.

3. A test system as claimed in claim 2, characterized in that in said modulator said bistable circuit having trigger hysteresis comprises an operational amplifier, an input of which is connected to a reference voltage and the output of which is connected to an inverter circuit, and said second resistance network comprises a series arrangement of two resistive circuits connected between the output of said inverter circuit and the output of said logic means which comprises an "exclusive-OR" circuit, one input of which is connected to the output of said inverter circuit and the other input receives the test control signal, the junction of the two resistive circuits being connected to the other input of the operational amplifier.

4. A test system as claimed in claim 1, characterized in that said transmission filter is an active filter the elements of which are arranged such that its transfer function is the sum of a first term corresponding to a second-order low-pass filter and a second term corresponding to a second-order band-pass filter, said elements being chosen such that during normal operation said second term is substantially eliminated and the resonant frequency $f_r$ of the low-pass filter corresponding to said first term allows the transmission of the two frequencies $f_1$, $f_2$ transmitted by said modem, the filter being modified by said changing means in response to the test control signal so that during the testing mode the resonant frequency $f'_r$ of the band-pass filter corresponding to said second term is substantially equal to the average value of the two test frequencies $nf_1$, $nf_2$, n being said multiplying factor.

5. A test system as claimed in claim 4, characterized in that in said transmission filter said changing means comprises a resistive network, the resistance value thereof being a function of said test control signal and which determines the resonant frequency of the filter during normal operation and during the testing mode.

* * * * *